United States Patent [19]

Artzer

[11] 4,340,802

[45] Jul. 20, 1982

[54] METHOD AND APPARATUS FOR WELDING

[75] Inventor: Richard F. Artzer, Riverside, Calif.

[73] Assignee: Covington Brothers Technologies, Fullerton, Calif.

[21] Appl. No.: 76,542

[22] Filed: Sep. 17, 1979

Related U.S. Application Data

[63] Continuation-in-part of Ser. No. 33,857, Apr. 27, 1979, abandoned, which is a continuation-in-part of Ser. No. 857,235, Dec. 5, 1977, Pat. No. 4,226,067.

[51] Int. Cl.³ .................... B23K 11/32; B23K 11/10
[52] U.S. Cl. .................................... 219/56; 219/58; 219/87; 219/89; 140/112
[58] Field of Search .................. 219/56, 86, 24, 58, 219/89, 87; 140/112

[56] References Cited

U.S. PATENT DOCUMENTS

| | | |
|---|---|---|
| 633,213 | 9/1899 | Perry . |
| 1,042,885 | 10/1912 | Budd et al. . |
| 1,448,566 | 3/1923 | Muller, Jr. et al. . |
| 1,507,425 | 9/1924 | Reed et al. . |
| 1,554,030 | 9/1925 | Reed . |
| 1,661,156 | 3/1928 | Armstrong . |
| 1,694,081 | 9/1928 | Reed . |
| 1,908,050 | 5/1933 | Reed . |
| 1,984,742 | 12/1934 | Hauck ................... 140/112 |
| 2,033,851 | 3/1936 | Roth ......................... 219/4 |
| 2,040,349 | 5/1936 | Wagner .................... 219/4 |
| 2,057,017 | 10/1936 | Ganahl ..................... 219/4 |
| 2,187,129 | 1/1940 | Kramer ................... 140/112 |
| 2,260,928 | 10/1941 | Bixby ....................... 219/4 |
| 2,293,338 | 8/1942 | Harris ...................... 219/89 |
| 2,324,435 | 7/1943 | Smith ....................... 219/10 |
| 2,365,181 | 12/1944 | Fentress .................. 138/50 |
| 2,368,047 | 1/1945 | Southwick ............... 140/112 |
| 2,390,174 | 12/1945 | Roemer .................... 219/4 |
| 2,401,319 | 6/1946 | Roemer .................... 140/7 |
| 2,422,829 | 6/1947 | Fotie ....................... 219/4 |
| 2,465,390 | 3/1949 | Mueller et al. ......... 140/12 |
| 2,487,392 | 11/1949 | Southwick ............... 219/4 |
| 2,596,453 | 5/1952 | Weidel ..................... 219/6 |
| 2,810,817 | 10/1957 | Brems et al. ............ 219/87 |
| 2,820,882 | 1/1958 | Johnson ................ 219/117.1 |
| 2,846,561 | 8/1958 | Pityo ....................... 219/79 |
| 2,899,537 | 8/1959 | Grebner ................... 219/79 |
| 2,939,206 | 6/1960 | Keller ...................... 29/155 |
| 2,957,070 | 10/1960 | Schachter et al. ....... 219/79 |
| 3,010,493 | 11/1961 | Fingerut ................. 140/112 |
| 3,050,614 | 8/1962 | Brown et al. ............ 219/56 |
| 3,194,935 | 7/1965 | Stoeckel .................. 219/56 |
| 3,213,898 | 10/1965 | Grady et al. ........... 140/112 |
| 3,215,169 | 11/1965 | Silliman et al. ........ 140/112 |
| 3,219,066 | 11/1965 | Smith .................... 140/112 |
| 3,439,606 | 4/1969 | Bursik et al. ............ 100/26 |
| 3,588,417 | 6/1971 | Gott et al. .............. 219/56 |
| 3,676,632 | 7/1972 | Ritter et al. ............ 219/58 |
| 3,706,331 | 12/1972 | Pennington .......... 219/56 X |
| 3,769,485 | 10/1973 | Harada et al. .......... 219/56 |
| 3,780,253 | 12/1973 | Senn ....................... 219/87 |
| 3,838,241 | 9/1974 | Weismann ............... 219/56 |
| 3,898,416 | 8/1975 | Shotting et al. ........ 219/80 |
| 4,079,560 | 3/1978 | Weismann ............. 52/309.7 |
| 4,120,330 | 10/1978 | Weismann ............... 140/12 |
| 4,160,147 | 7/1979 | Matsubara et al. ..... 219/87 |
| 4,162,387 | 7/1979 | DeCandia ........... 219/86.24 X |
| 4,221,951 | 9/1980 | Connolly ................. 219/56 |

FOREIGN PATENT DOCUMENTS

| | | |
|---|---|---|
| 615263 | 6/1935 | Fed. Rep. of Germany . |
| 1150176 | 1/1958 | France . |
| 45-5883 | of 1970 | Japan . |
| 474473 | 11/1937 | United Kingdom ........ 219/89 |
| 322243 | 2/1972 | U.S.S.R. .................. 219/56 |

OTHER PUBLICATIONS

The American Machinist Publication, Apr. 2, 1981, p. 119, Shows Hydraulic Control of a Number of Weld Electrodes.

*Primary Examiner*—J. V. Truhe
*Assistant Examiner*—Keith E. George
*Attorney, Agent, or Firm*—Gausewitz, Carr, Rothenberg & Edwards

[57] ABSTRACT

A three-dimensional composite structural panel composed of a number of parallel trusses mutually spaced by interposed insulative elements and interconnected by cross wires, is fabricated by positioning a cross wire transversely of the longitudinal runner wires of trusses after they are stacked in alternation with the insulative elements, and then welding the cross wire to the runner wires at each point of contact. Rows of electrodes, one for each side of the lattice, are mounted to simultaneously resistance weld a single cross wire at each side of the lattice to all of the trusses of a panel. All of the electrodes are pressed against the wires to be welded by means of individual fluid motors energized with a common fluid pressure and separately driving individual electrodes. A plurality of backup fingers, normally positioned out of the path of motion of the stack of trusses and filler elements as the stack moves past the rows of opposed electrodes, are shiftable to a weld position in the path of extension of the runner wires and cross wires as they are pressed by the electrodes during the welding.

39 Claims, 12 Drawing Figures

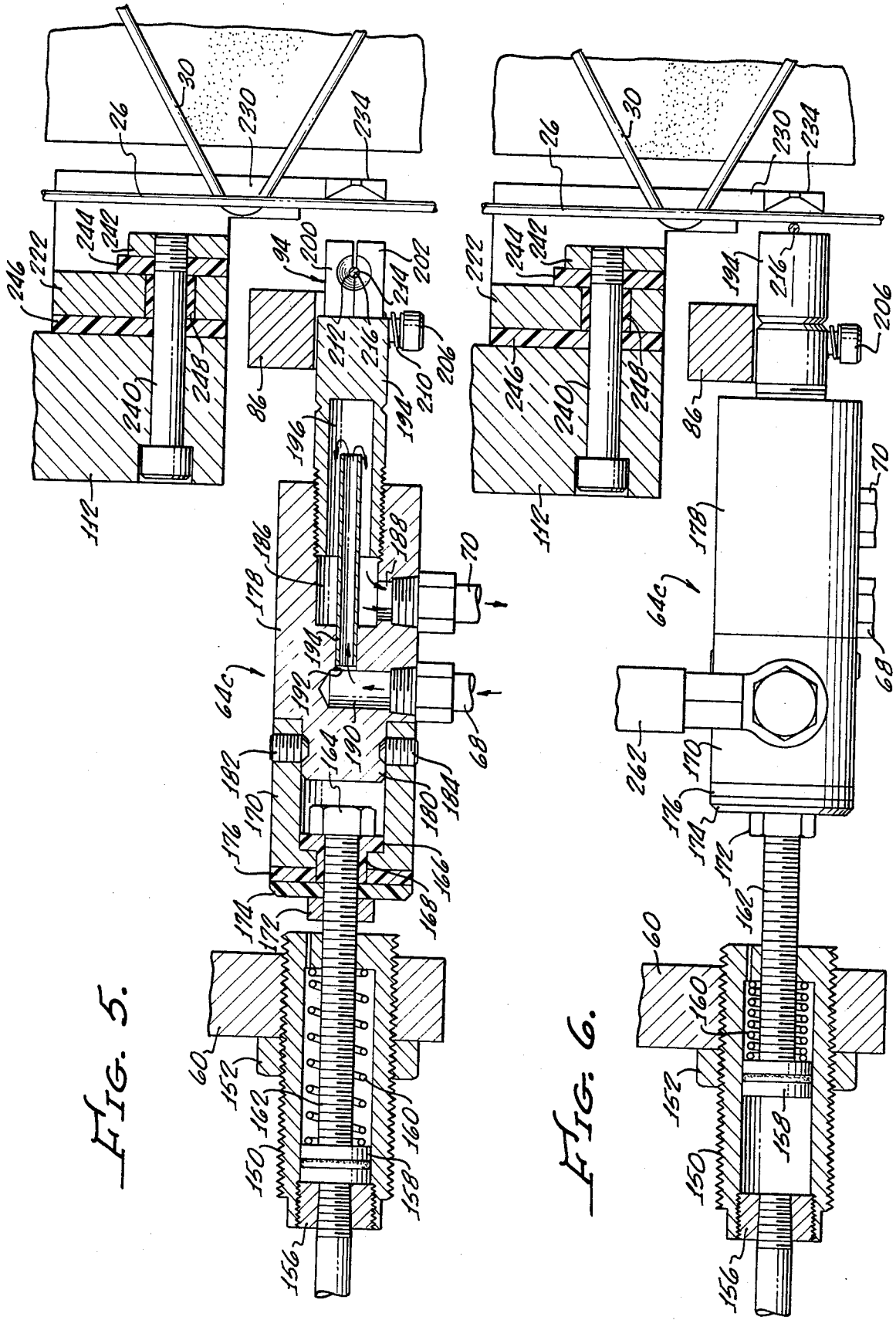

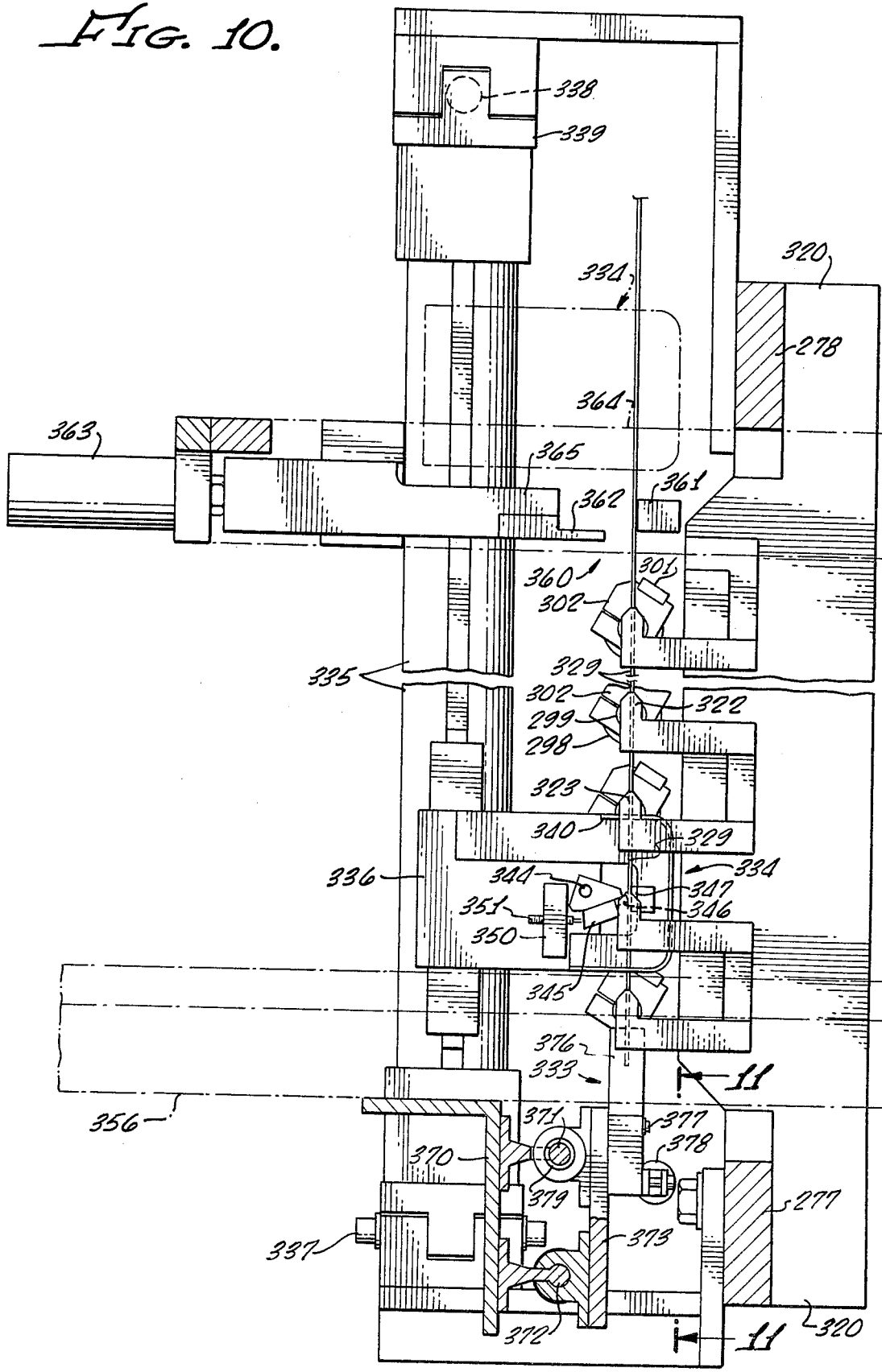

METHOD AND APPARATUS FOR WELDING

This application is a continuation-in-part of my application for ADJUSTABLE WELDING HEAD, Ser. No. 033,857, filed Apr. 27, 1979 (now abandoned), which is a continuation-in-part of my co-pending application for STRUCTURAL PANEL, Ser. No. 857,235, filed Dec. 5, 1977 now U.S. Pat. No. 4,226,067, the disclosures of which are incorporated by this reference as though fully set forth herein.

BACKGROUND OF THE INVENTION

The present invention relates to structural panels, and more particularly concerns methods and apparatus that are specially useful for welding a workpiece that may be used as part of a structural panel having a core reinforced by a three-dimensional wire matrix. Various configurations employing combinations of lightweight insulative filler material, such as cellular plastic foams, and rigid load bearing structural elements have been suggested in the past for providing structural building panels that can effectively utilize desirable properties of the filler materials. Some of such prior art arrangements are shown in the U.S. patents to Weismann Nos. 3,305,991, 3,555,131 and 3,879,908.

In my co-pending application for a Structural Panel, Ser. No. 857,235, filed Dec. 5, 1977, and in my co-pending application for Method and Apparatus for Manufacture of Wire Truss and Sinuous Strut Therefor, Ser. No. 014,988, filed Feb. 26, 1979, and my co-pending application for Composite Structural Panel with Offset Core, Ser. No. 023,590, filed Mar. 26, 1979, there are described composite foam and wire matrix structural panels in which a number of twodimensional lattice structures or wire trusses and a number of elongated foam filler elements are stacked in consecutive alternation and then laterally pressed against one another to forcibly embed the trusses in the filler elements. While holding such stacked wire trusses and filler elements in laterally pressed condition, the trusses are fixedly secured to one another by means of a number of mutually spaced transversely extending cross members which are welded to the runner wires of the respective trusses. Specific configurations of those panels and certain aspects of methods of construction thereof are set forth in detail in the prior applications, the disclosures of which are incorporated by this reference as though fully set forth herein.

The present invention is concerned with methods and apparatus for welding of one wire to a number of other wires. Such methods and apparatus are uniquely adapted for the welding of cross wires of the abovedescribed stack of alternate wire trusses and foam filler elements in the manufacture of such composite structural panels. Although the methods and apparatus described herein are specifically adapted for manufacture of such panels, the apparatus and methods described herein may readily be employed for manufacture of other articles.

SUMMARY OF THE INVENTION

In carrying out principles of the present invention in accordance with a preferred embodiment thereof, a workpiece is resistance welded at a number of points by mounting a number of electrodes so as to enable application of like welding pressures at several points. A plurality of fluid motors are mounted in predetermined relative positions and a plurality of weld electrodes are mounted to respective ones of the motors to be shifted thereby. Fluid pressure is applied to the motors so as to shift the electrodes into contact with the workpiece and to press the electrodes against the workpiece with a force related to the pressure applied to the motors. The electrodes are mounted for motion along a stroking path between retracted and extended positions so that all of the electrodes will press against the workpiece with a like force determined by the like fluid pressure applied to the motors, the force being independent of the distance that the electrodes travel along the path into contact with the workpiece.

According to a feature of the invention, a plurality of backup fingers are mounted so as to be normally out of the path of motion of the trusses as they move past the welding electrodes, but are shiftable into a backup position for the welding operation.

According to another feature of the invention, a cross wire is pulled across a stack of mutually spaced trusses and held at its opposite end portions to properly position the cross wire as the electrodes are advanced to press the cross wire against lateral side wires of the stack of trusses.

BRIEF DESCRIPTION OF THE DRAWING

FIG. 5 is a horizontal sectional view showing a single weld head and its backup arrangement in retracted position.

FIG. 6 is a horizontal view, showing certain parts in section, of the apparatus of FIG. 5 with the weld electrode extended to welding position.

FIG. 10 is an elevational view of one bank of electrodes, backup fingers, wire puller and clamp of the modified apparatus.

DETAILED DESCRIPTION

As described in fuller detail in the above-identified pending applications, a composite wire and foam panel (FIG. 1) comprises a stack of steel wire trusses 10, 12, 14, 16 and interposed elongated filler elements 18, 20, 22, 24. Each truss is formed of a pair of mutually spaced parallel runner wires 26a, 28a, interconnected by a continuous and sinuous strut wire 30 that is welded to each runner wire adjacent each of the strut wire apices. Each filler element is a relatively long, substantially square or rectangular cross section strip of insulative material, such as for example a polystyrene or polyurethane foam. Each truss may be approximately three inches wide and each filler element approximately two to two-and-one-half inches square, the trusses and filler elements being eight feet long for manufacture of an eight foot panel. A stack of twenty-four filler elements and twenty-five trusses will thus provide a panel of about four foot width when the stack is compressed to embed the wire trusses into the mutually facing and fully contacting surfaces of the filler elements.

Figure 1:
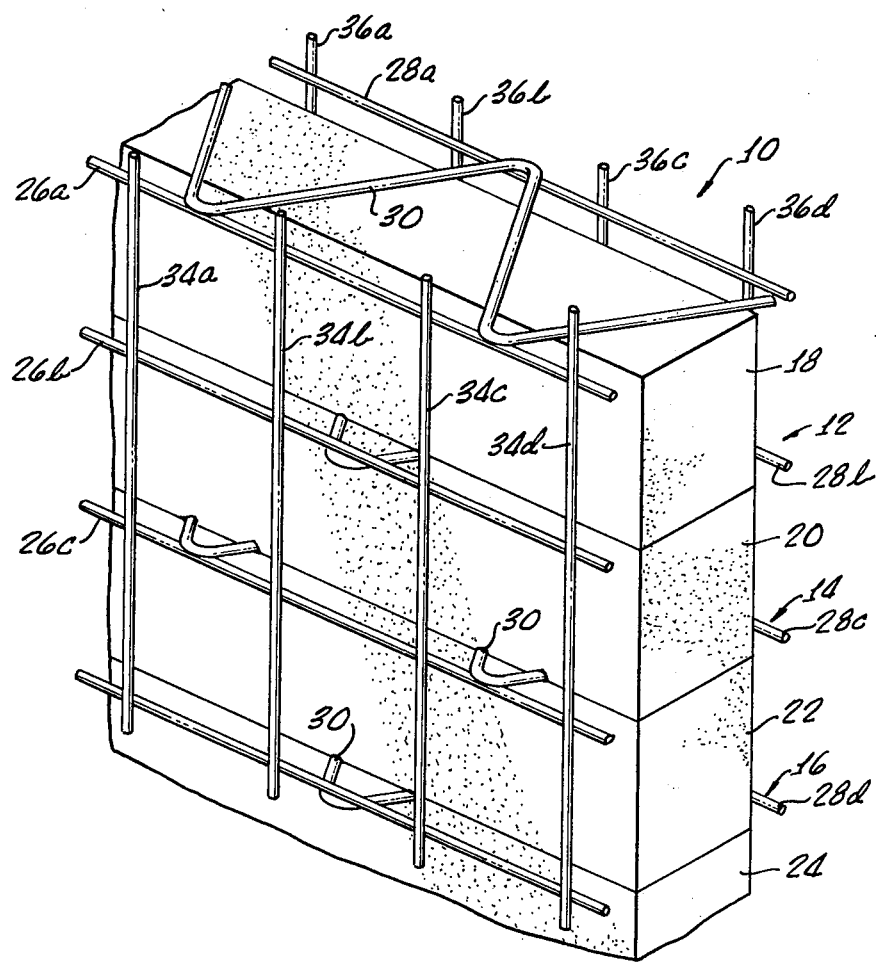
FIG. 1 is a perspective view of portions of a completed composite wire and foam panel having cross wires welded to the panel trusses by methods and apparatus of the present invention.

While the stack of filler elements and trusses are held in compressed condition, cross wires 34a, 34b, 34c, 34d, etc., on one side of the panel and cross wires 36a, 36b, 36c, 36d, etc., on the other side of the panel are resistance welded to the respective truss runner wires 26a, 26b, 26c, 26d, etc., on one side and 28a, 28b, 28c, 28d, etc., on the other side. It may be noted that the truss struts are staggered so that apices of one truss are not vertically aligned (with the panel oriented as shown in FIG. 1) with apices of adjacent trusses, and the cross wires are positioned on each side of each apex, with a pair of cross wires between the two adjacent apices of a single strut wire. In the completed panel, the trusses are spaced approximately two inches apart and the cross wires are likewise spaced approximately two inches apart. The panel is commonly erected with the trusses and filler strips vertical.

In manufacture of the panel, the trusses are fabricated by suitable techniques such as the apparatus and methods described in the above-identified co-pending application for Method and Apparatus for Manufacture of Wire Truss and Sinuous Strut Therefor, Ser. No. 014,988, and then stacked in alternation with the two-inch-by-two-inch, eight foot long strips of insulative foam filler elements. The parts of the relatively loose stack may be held in alignment with the trusses and filler elements extending horizontally upon a fixture that includes a panel carrier 40 (FIG. 2) and an upper pressure bar 42. A plurality of vertically extending rods (not shown) are fixed to the panel carrier and extend through aligned apertures (not shown) in the filler elements and through the trusses. Such rods are temporarily secured to the upper pressure bar 42 to hold the stack in compressed condition (after the stack is compressed by moving bar 42 downwardly) with the wire trusses embedded into mutually facing and contacting surfaces of the filler elements. The compressed stack then has the several cross wires 34, 36 welded to the truss runner wires.

It is to the method and apparatus for welding the cross wires to the trusses that the present invention is most particularly directed. Nevertheless, it will be observed as the description proceeds that certain aspects of the weld heads and their mounting will have wide applicability to many other methods and apparatus for welding of different devices.

In the welding methods and apparatus described herein, the compressed stack of horizontally extending trusses and interleaved filler elements is passed between two vertically extending rows of welding heads. The stack is moved in two inch steps (where two inches is the distance between successive or adjacent cross wires) either manually or, preferably, by automatic means. With the stack at rest, a pair of cross wires are positioned, one at each side, transversely of the truss runner wires and the rows of welding heads are advanced to resistance weld each intersection of a cross wire and a runner wire. For the four foot high stack described herein, having a truss at the top and bottom, there are twenty-five trusses and thus each row of welding heads has twenty-five separate welding assemblies. After a pair of cross wires is welded to the runner wires, the entire stack is advanced horizontally another two inches between the welding head rows, and a second pair of cross wires is positioned and resistance welded. This step and weld cycle continues for the entire eight foot length of the panel, until one cross wire has been welded to the trusses every two inches on each panel side.

Figure 2:
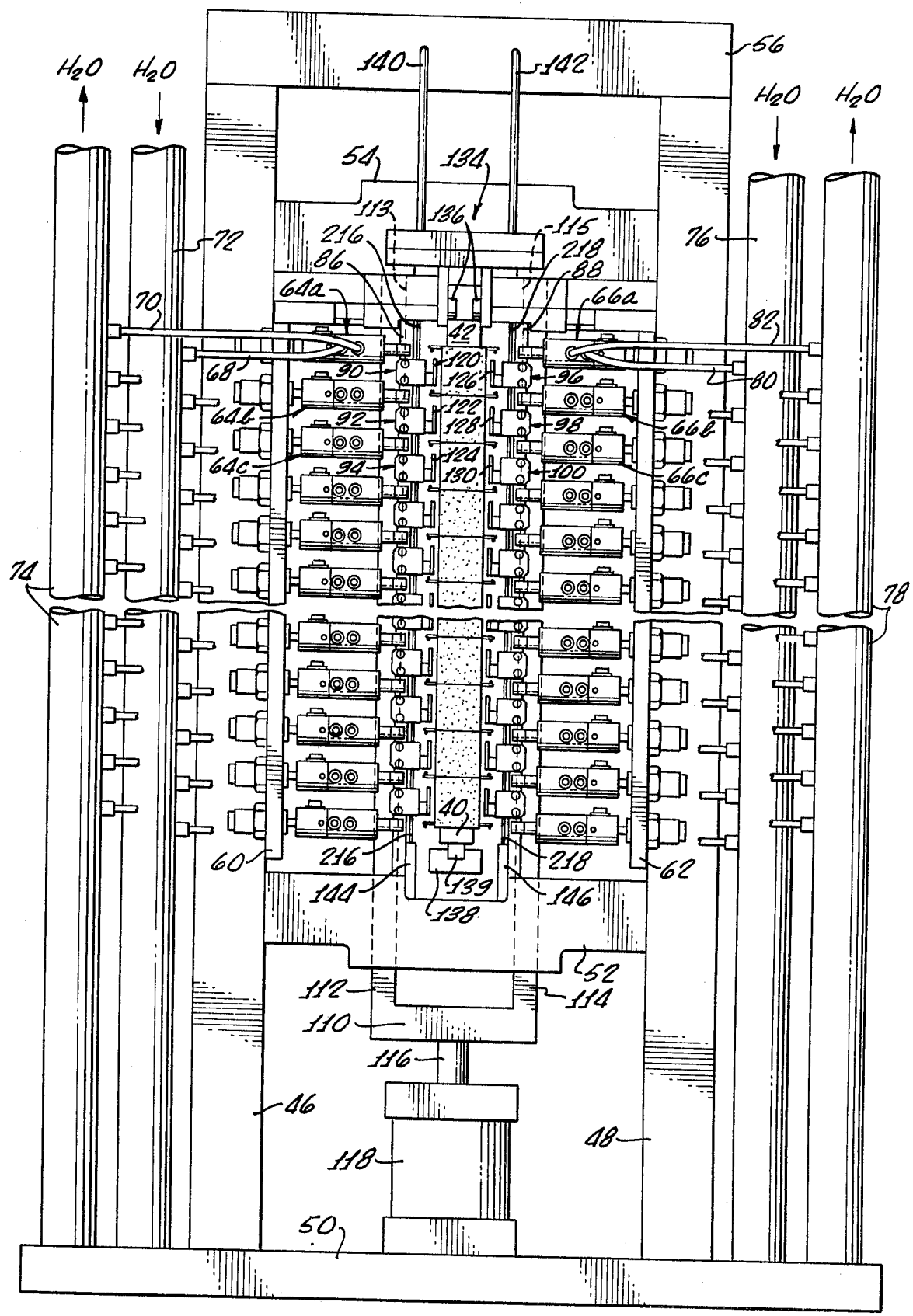
FIG. 2 is a front elevation view of welding apparatus embodying principles of the present invention.

As shown in FIG. 2, the welding apparatus includes a structural support frame having a pair of spaced upstanding posts 46, 48 mounted upon a base 50 and interconnected by a horizontally extending lower cross beam 52, a horizontally extending upper cross beam 54 and a horizontally extending top beam 56. Vertically extending weld head mounting beams 60, 62 are fixedly secured to the structural frame as by being bolted to the posts 46, 48, for example, and each carries a vertically extending row of mutually spaced, horizontally disposed weld head assemblies 64a, 64b, 64c, etc., and 66a, 66b, 66c, etc. Each weld head assembly is provided with a cooling liquid via a pair of conduits such as conduits 68, 70 of weld head 64a. Input conduit 68 is connected between the weld head and an inflowing liquid manifold pipe 72, the latter being connected to an input conduit of each weld head on one side of the apparatus. Each output conduit 70 of the weld heads 64 is connected between the weld head and a return liquid manifold 72 so that the cooling liquid may flow from the manifold 72 to each of the weld heads, through the head, and thence back to the return manifold pipe 74. Similarly, on the other side of the apparatus, the weld heads are connected to input and return liquid manifolds 76 78, by input and output conduits such as those designated at 80, 82.

Fixed to and between the upper and lower cross beams 52, 54 is a pair of vertically extending guide support bars 86, 88, each carrying a vertically extending row of mutually spaced guides such as those indicated at 90, 92, 94, one one side and 96, 98, 100, on the other side. One guide is provided between weld heads of each pair of adjacent weld heads in each of the two rows.

A vertically extending bifurcated backup finger carrier 110, having horizontally spaced, vertically upstanding carrier arms 112, 114, has its upper end slidably received in downwardly facing guideways 113, 115 of the upper cross beam 54. The carrier is supported on a vertically extending actuator 116 of an hydraulic finger carrier motor 118, which itself is mounted upon base 50. Each arm 112, 114 of the finger carrier fixedly supports a vertically extending row of backup fingers, such as those designated at 120, 122, 124, 126, 128 and 130 in FIG. 2.

Upper pressure arm 42 of the stack of trusses and filler elements is guided for motion between the vertically extending rows of electrodes in an upper track 134 carrying guide rollers 136 that bear upon the upper surface of the pressure member 42. Carrier 40 supports the stack as the carrier, stack and pressure member all travel in steps between the electrode rows along a fixed lower horizontal track 138. Panel carrier 40 carries a depending guide 139 slidably received in an upwardly facing guideway groove that extends along the length of the lower track.

Upper track 134 is apertured to receive cross wire guide tubes 140, 142 having their upper ends bent to extend horizontally toward the rear of the frame to receive lengths of cross wire that are withdrawn from wire supply rolls (not shown). Cross wires 216, 218, extending through the guide tubes 140, 142, are pushed downwardly through each of the vertically aligned rows of wire guides 90, 92, 94, etc., and 96, 98, 100, etc., to abut against switch mechanisms 144, 146 which operate upon contact by the lower ends of the cross wires to initiate welding. In the welding step, which begins after a pair of cross wires has been properly positioned in the wire guides, finger carrier 110 is raised to position each of the backup fingers behind a truss runner and the weld heads are actuated to drive the weld electrodes toward the backup fingers and to press the cross wire against each runner wire, whereupon welding current is applied and resistance welding is accomplished to weld each cross wire of a pair to each runner wire of each truss.

To facilitate positioning and connection of the electric lines to each of the weld heads, the weld heads and backup fingers are operated in pairs so that current flows through one weld head electrode, through the workpiece formed by the intersecting cross wire and runner wire, through the backup finger to the next lower backup finger and also through the cross-wire, back through the intersection of the next lower runner wire and cross wire, and then back through the next lower electrode and back to the power supply. Where an odd number of weld heads is employed in each vertical row of weld heads, the current path of one of the electrodes is unique since it cannot be paired with another electrode. In this case, it is convenient to connect the uppermost electrode of each row to one side of the power supply and to connect the associated uppermost backup finger of each row to the other side of the power supply since these uppermost elements are most readily accessible.

As illustrated in detail in FIGS. 3, 4, 5 and 6, each weld head, which is identical to each other weld head, is formed of a fluid motor having an externally threaded cylinder 150 mounted in an internally threaded aperture of weld head mounting beam 60 and locked in axially adjusted position relative to the beam by means of a threaded nut 152. The motor is of the spring-return type, having an input/output fluid fitting 156 connected to the rear end of the cylinder. The cylinder slidably carries a piston 158 which is urged to a rearmost retracted position by means of a compression spring 160 compressed between the piston and the forward end of the cylinder. A piston shaft 162, which is the extensible motor actuator, carries an enlarged tool receiving head 164 extending through a flanged bushing 166 that has a hub 168 extending through an aperture in the rear end of a cup-shaped coupling 170. The coupling is fixedly connected to actuator 162 by means of a nut 172 threaded on the actuator and pressing upon a pair of washers 174, 176 interposed between the nut and the rear end of the coupling 170.

An electrode carrier 178 has a reduced diameter rear end 180 formed with a circumferential groove that receives a pair of locking screws 182, 184 threaded in radially extending apertures at the forward end of the coupling and having ends seated in the carrier groove. The forward end of the carrier has a forwardly opening bore 186 communicating with a radially extending cooling aperture 188. A second radially extending cooling aperture 190 in the electrode carrier communicates with the interior of bore 186 by means of an axially extending passage 192 in which is inserted a small diameter cooling tube 194.

Detachably mounted in the carrier 178, as by the illustrated threaded arrangement, or by means of a taper, press fit or other comparable mounting arrangement, is an electrode tip 194 having a rearwardly extending and rearwardly opening bore 196 that receives a forwardly extending end of the cooling tube 194. Aperture 190 is connected to the input cooling conduit 68 (FIG. 2) and aperture 188 is connected to the return cooling conduit 70.

Figure 3:
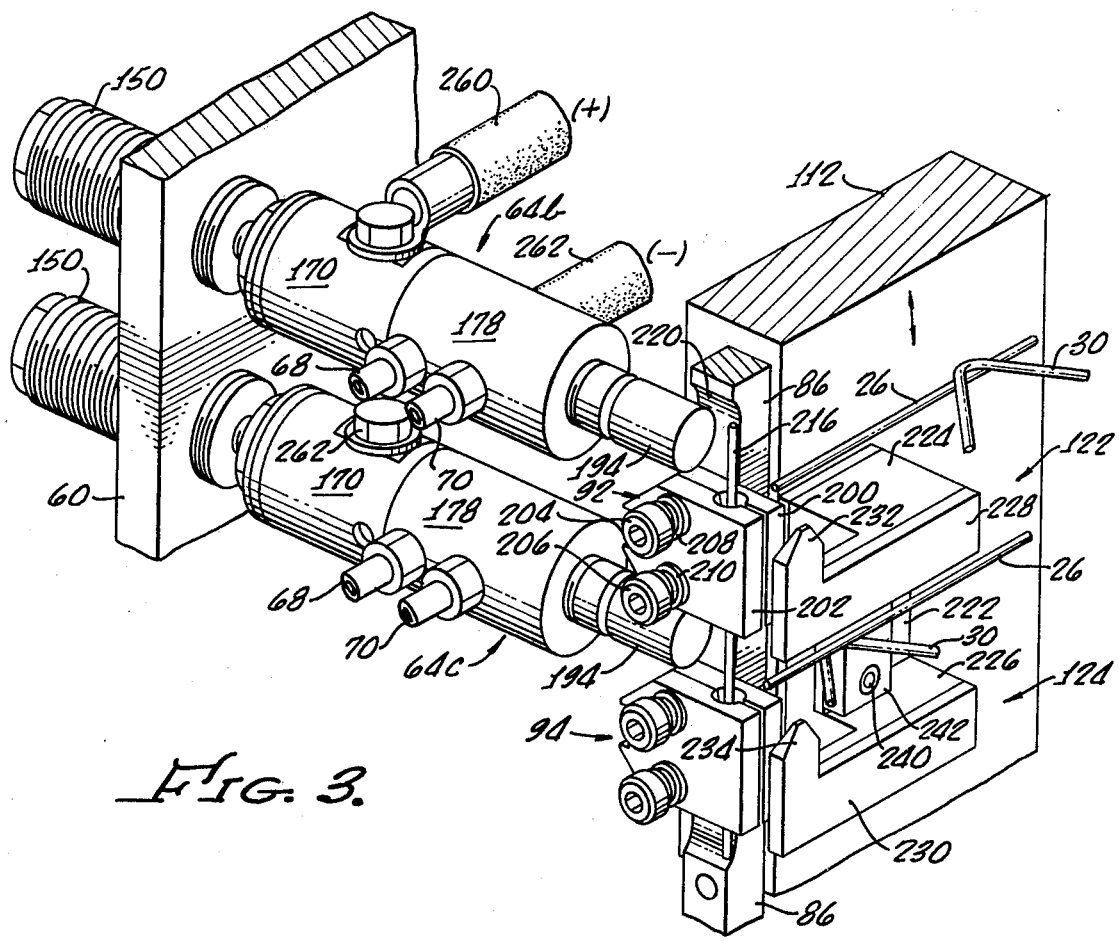
FIG. 3 is a perspective view, enlarged relative to the showing of FIG. 2, illustrating operation of a pair of adjacent welding heads on one side of a panel being welded.

Each of the wire guides 90, 92, 94, etc., is identical to each other guide and, as illustrated in FIGS. 3 and 5 for wire guide 92, each comprises an inner guide plate 200 fixed to the guide support bar 86 and an outer guide plate 202 movably mounted to the fixed guide plate upon a pair of studs 204, 206 fixed to the inner guide plate and carrying springs 208, 210 interposed between a head fixed to the studs and the outer surface of the outer guide plate. The guide plates are formed with vertically extending mating grooves 212, 214 for receiving a cross wire such as the cross wire 216 illustrated in FIGS. 3, 4 and 5. Upper ends of the mating grooves of the guide plates are conically enlarged to provide an upwardly diverging conical guide surface at the upper end of each wire guide to facilitate insertion of the cross wire therebetween. The guide support bar 86 is cut away as indicated as 220 to allow the electrode tip 194 to pass across the guide bar without interference as it advances into welding position.

As previously mentioned, the backup fingers are operated in electrically interconnected pairs. Thus, for example, as shown in FIG. 3, backup finger assemblies 122 and 124 are formed of a single U-shaped finger support 222 bolted to backup finger carrier 112 and having horizontally projecting upper and lower arms 224, 226 to which are fixed respective L-shaped fingers 228, 230 of a finger pair. Each finger extends horizontally from its finger support and terminates in respective upwardly extending projections 232, 235 that have tapered upper ends, as illustrated, to ensure close, contacting positioning of the finger projection behind the truss runners 226 when the fingers are raised to the weld position. Each finger support 222 is bolted to the finger carrier 112 by means of headed bolts such as bolt 240 (FIG. 5) threaded in a clamp plate 242 that bears upon the finger support 222 by means of an interposed electrically insulative strip 244. Support 222 is similarly insulated from the carrier 112 by an interposed electrically insulative strip 246 and is electrically insulated from the bolt by means of an insulative sleeve 248. Accordingly, the backup fingers are electrically insulated from all of the weld apparatus so as to electrically contact only the workpiece during the weld operation.

OPERATION

Figure 4:
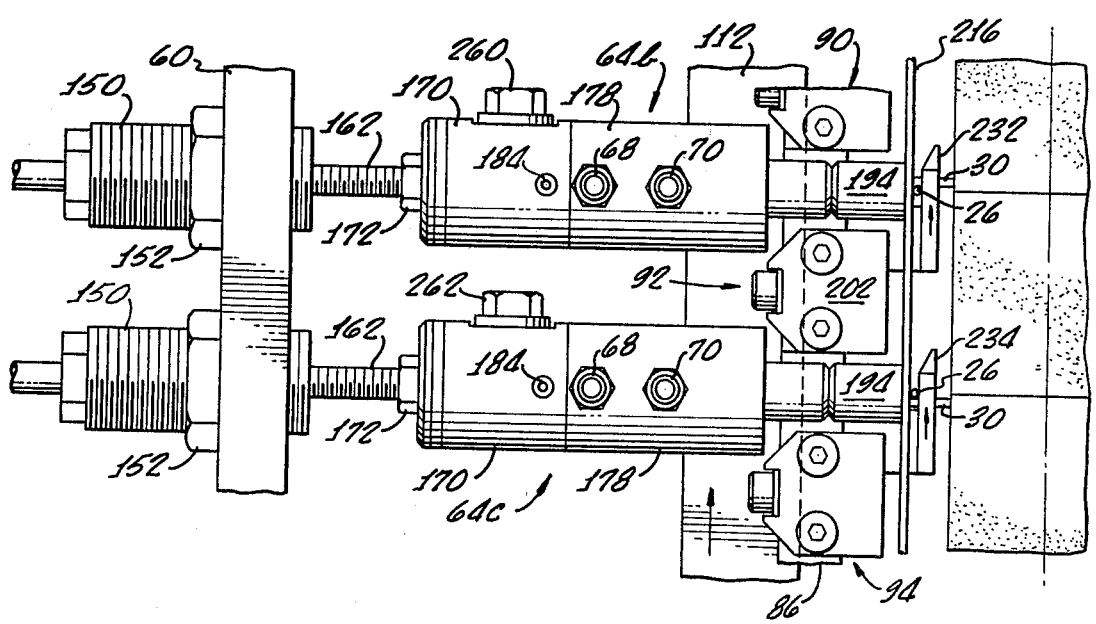
FIG. 4 is a side elevational view showing the electrodes of FIG. 3 in welding position.

The stack of horizontally extending filler elements and trusses mounted upon and compressed between the panel carrier 40 and the upper pressure arm 42 is moved along and between the panel tracks 134, 138 in incremental steps, each equal to the distance between the cross wires that are yet to be welded to the truss runner wires. Stack motion along the track may be controlled by any suitable means. The stack may be moved manually or by automatic means, as is presently preferred. The stack moves in a horizontal direction through the welding apparatus between the vertically extending rows of weld heads on either side. As the stack moves between the rows of weld heads and between the vertically extending rows of backup fingers, the truss wires on either side of the stack are positioned laterally outwardly of the backup fingers. In other words, the backup fingers are positioned in the space between the outer surfaces of the foam filler elements and the inner sides of the truss runner wires, as can be seen in FIGS. 4, 5 and 6. It will be observed that the filler elements collectively form planar core surfaces that are spaced inwardly by approximately one-half inch to three-quarters of an inch from the truss runner wires. The vertical extent of each individual finger is less than the distance between adjacent trusses. Thus, with the fingers in their retracted or lower position, the stack may readily travel horizontally between the rows of electrodes and between the rows of backup fingers so that the fingers in effect pass between portions of adjacent trusses.

The stack is stopped in a first position, and a first pair of cross wires such as cross wire 216 on one side of the stack and a corresponding cross wire 218 on the other side of the stack are pushed downwardly through the feed tubes 140, 142 and through each of the wire guides 90, 92, 94, 96, 98, 100, etc., until the end of the cross wires contact and actuate switches 144, 146. Actuation of these switches initiates the advance of the electrodes and the raising of the finger carrier 110. Switches 144, 146 and their function may be eliminated in a manually operated arrangement. The finger carrier motor 118 is actuated to shift each finger upwardly from its retracted position, illustrated in FIG. 3, to its weld position, illustrated in FIG. 4. In the weld position, the backup fingers are in contact with and extend both above and below the truss runner wires, being positioned between the runner wires and the filler elements of the stack.

Pressurized hydraulic fluid is applied to the weld head cylinders and all of the electrodes advance along horizontally extending paths between adjacent pairs of guide plates. FIG. 5 illustrates the apparatus prior to welding, with the weld electrode in retracted position. As the fluid motor is pressurized, its actuator 162 is driven forwardly, moving the electrode along its advancing path to its weld position, illustrated in FIGS. 4 and 6, in which the cross wire is pressed against the runner wires and against the backup fingers with the requisite welding pressure. The electrodes advance directly to the cross wires 216, 218 to cause the electrodes to contact these wires at areas thereof between the adjacent pairs of guides. As the electrodes contact the cross wires, they press the wires laterally inwardly toward the truss runner wires and thus force the movable outer guide plates 202 to shift outwardly by an amount sufficient to allow the cross wires to be pushed out of the guide plate grooves and against the truss runners.

When the electrode tips have pressed the cross wires against the truss runners into firm contact therewith, thereby pressing the runners against the upwardly extended backup fingers, further motion of the electrode tips is prevented since the backup fingers are fixed to the finger carrier 110 which is mounted so as to be restrained against any lateral motion. Now the welding current is applied, flowing as previously described from one side of the power supply, through a first electrical lead 260 (FIG. 3) connected to the coupling 170 of one weld head such as weld head 64b, for example. Electric current then flows through the electrode carrier, through the electrode tip, through the cross wire, through the truss runner and into backup finger 232. From this backup finger the current flows through the finger support, through the second finger 234 of the pair, through the next lower truss runner wire, again through the cross wire, and then through the weld head 64c to the electric lead connected to bolt 262 of the weld head coupling, and thence to the other side of the power supply. A significant portion of the current also flows through the cross wire between intersections with the truss runner.

On completion of the resistance welding, all of the electrodes are retracted, the backup fingers are lowered, and the stack is advanced through the next two inch increment. Then two more cross wires are positioned in the several wire guides, and the welding cycle previously described is repeated. Where continuous rolls of wire are employed to serve as cross wire supplies, each cross wire may be severed at a point adjacent the upper cross beam 54 after the cross wires have been pressed by the weld electrodes against the truss runners.

A significant aspect of the described embodiment is the unique mounting of all of the weld electrodes upon the respective actuators of the individual fluid motors. Each fluid motor is provided with a stroke that is greater than the maximum distance of travel of the weld electrode during its advance toward the wire workpiece. All of the motor cylinders are supplied from a common source of hydraulic fluid (not shown) so that the same pressure is applied to each cylinder. Since each cylinder stroke is greater than the required distance of travel of the electrode, the latter will be driven forwardly, driving the cross wires against the runner wires, until further motion is stopped by the fixed backup fingers. Moreover, regardless of the position in which the advance of the weld tip is stopped by resistance of the backup finger, the pressure within the fluid motor remains the same, and thus, the pressure of the electrode on the workpiece is automatically maintained at a constant value (for a constant pressure applied to the cylinders), regardless of wear on the electrode, shifting of backup finger position, or other factors. For proper resistance welding it is important that a significant pressure be exerted by the electrode upon the workpiece and that this pressure be the same for all of the welds being made. In an exemplary embodiment, the pressure exerted by each electrode is ninety pounds.

The external threading of the motor cylinders allows these to be mounted for axial adjustment and provides a convenient and rapid mode of mounting of the entire weld head assembly. More importantly, the use of individual fluid motors, each mounting its own weld electrode, ensures that each electrode will provide the same pressure upon the workpiece over the life of the apparatus and that it will not be subject to varying pressures as might be the case where the pressure of the electrode is determined by an interposed compression spring that is subject to aging, and changes of resilience. Further, it is not necessary to individually adjust the electrodes, as is also required where spring pressure is employed, since the like fluid pressure applied to all cyinders ensures that each electrode will exert the same pressure upon the workpiece.

Partly because of the high pressures and temperatures involved in the described resistance welding, the electrode tips are subject to wear, often becoming grooved by the pressure upon the electrically heated workpiece.

As the face of the electrode wears, the face may be dressed by removing worn surfaces. This changes the electrode length, of course, and requires a greater distance of electrode advance during the forward stroke. Regardless of grooving or other types of wear on the electrode tip, and regardless of the dressing of the tip, the fluid motor drive ensures that the electrode will continue to exert the initially determined pressure, a pressure which is determined by the pressure of fluid within the motor cylinder.

The use of set screws 182, 184 seating in the circumferential groove of electrode carrier 178 allows the carrier to be rotated to obtain a more even wear or more even grooving of the electrode tip.

The fluid motors may be operated either by air or hydraulic fluid. The latter is preferred for a smoother operation. Fluid pressure may be adjusted by conventional means, as for example, employing an "air over oil" regulator in which the hydraulic oil is confined in a container having air space and air pressure in the space is varied to control the hydraulic pressure.

Although the illustrated embodiments, corresponding to embodiments that have been initially built, employ wire guides 90 through 100 for positioning the cross wires prior to welding, it will be readily appreciated that other cross wire positioning means may be employed without departing from principles of the present invention. For example, the wire guides may be completely eliminated and an accurately straightened cross wire may be positioned transversely of the truss runners between the runners and the electrodes with its upper and lower ends firmly grasped so as to place the cross wire under substantial tension. Such tension will position the cross wires with sufficient precision so that they may be contacted by the advancing electrodes and driven against the several truss runners. In such an arrangement, when the cross wires are initially contacted by the advancing electrodes, the tensile force applied to the cross wires may be released to facilitate any required shifting of the cross wires against the runner wire, although the cross wires may be initially positioned closer to the runner wires when wire guides are not employed.

Where the cross wire and runner wires are of sufficient strength or where lesser weld electrode pressures are required, the backup fingers may be eliminated and the workpiece itself may provide sufficient resistance to the pressure of the welding electrode. In certain configurations, wires are being welded simultaneously to opposite sides of the workpiece. If those portions of the workpiece interposed between a pair of cross wires have sufficient strength, the pressure of the weld electrode on one side may be reacted against an equal and opposite pressure of the weld electrode on the other side, thus dispensing with the need for any interposed backup devices.

MODIFICATION

A modified version of the welding apparatus of FIGS. 2 through 6 is illustrated in FIGS. 7, 8, 9, 10, 11 and 12. The modified apparatus, which is presently preferred, operates on the same workpiece and in substantially the same manner as the initially-described apparatus, but with certain significant differences. Such differences include the mounting of all backup fingers and all electrodes on the same vertically reciprocable carrier frame. This allows the backup fingers to be lowered to clear the truss struts as the workpiece is advanced but maintains the alignment of each electrode with its associated backup finger. An improved and faster arrangement for positioning the cross wire includes a vertically reciprocal wire puller that cooperates with a wire clamp at the machine bottom to rapidly locate the cross wire where it may be held during welding and properly positioned for cutoff, all without use of the plurality of wire guides employed in the previously described embodiment. Other differences of this embodiment will become apparent as the description proceeds.

Figure 7:
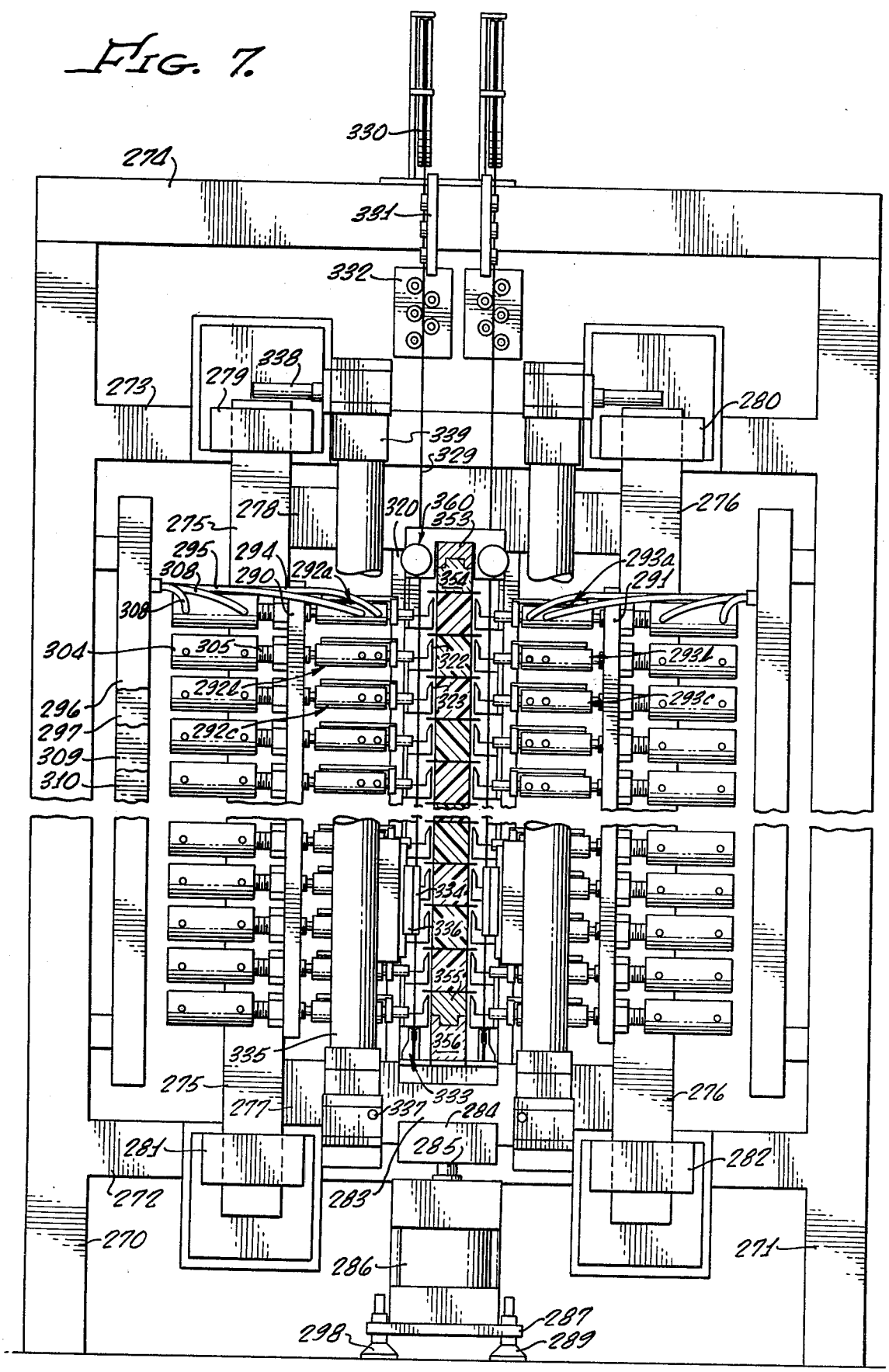
FIG. 7 is a view similar to FIG. 2, showing a modified form of welding apparatus.

As shown in FIG. 7, the modified welding apparatus includes a structural support frame having upstanding posts 270, 271 interconnected by lower, intermediate and upper horizontal cross beams 272, 273, 274. A generally rectangular carrier frame having vertical posts 275, 276 fixedly interconnected by a lower cross beam 277 and an upper cross beam 278 has the upper and lower ends of posts 275, 276 slidably mounted for vertical reciprocation in carrier frame guides 279, 280, 281, 282 that are fixedly mounted on the fixed frame cross beams 273 and 272, respectively.

Lower cross beam 277 includes a centrally positioned saddle 283 carrying a depending pressure block 284 that is fixed to the piston rod 285 of a suitable fluid motor such as an hydraulic motor or a double-acting air cylinder 286. Cylinder 286 rests upon a base 287 having adjustable leveling feet 288, 289 that support the cylinder and reciprocating frame independently of the fixed frame.

Vertically extending weld head mounting beams 290, 291 are fixedly secured to the reciprocating frame posts 275, 276, respectively, and each carries a vertically extending row of mutually-spaced horizontally-disposed weld head assemblies 292a, 292b, 292c, etc., on one side and 293a, 293b, 293c, etc., on the other side. Each weld head assembly is provided with cooling liquid via a pair of conduits, such as conduits 294, 295 of weld head 292a. The liquid conduits are connected to input and output waterflow manifolds 296, 297. The weld head assemblies are arranged in a vertical row and in the same relative positions and the same numbers as in the previously-described embodiment. Each weld head assembly, such as weld head assembly 292b for example (see FIGS. 8 and 9), includes a weld head body 298 having an electrode 299 to which elctric current is conducted via an electric cable 300 that is connected to an electrically conductive bar 301 extending rearwardly from and fixed to a conductive clamp 302 that is electrically and physically connected to the electrode 299 at a rear portion thereof. The weld head body is mounted upon a piston rod 303 of a double-acting air cylinder 304. The air cylinder 304 carries a forwardly-extending externally-threaded hollow sleeve 305 adjustably threaded into an internally-threaded aperture in the weld head mounting beam 290 and secured by a nut 306. The piston rod extends through the sleeve 305 and is driven in one direction or the other by air under pressure supplied via hoses 307, 308 connected to air manifolds 309, 310, respectively.

A vertically extending backup finger carrier or support bar 320 is fixed at its upper and lower ends respectively to the upper cross bar 278 and the lower cross bar 277 of the vertically reciprocating frame. Backup fingers such as those designated at 322, 323 are connected together in pairs just as in the previously-described embodiment and fixedly mounted upon the backup finger carrier 320. Although the fingers of one pair of backup fingers are electrically connected to one another, it will be noted that about half of the current flow is through or between the fngers of such pair, and about half is through the cross wire that extends between a pair of vertically adjacent electrodes.

Wire guides 200, 202 of the embodiment of FIGS. 1-6 may interface with access to the electrodes for mounting or repair and require precise positioning to ensure a clear path of electrode movement, free of possible contact with the electrically conductive wire guides. Pushing the cross wire is difficult and relatively slow, even though the wire is of stiff fourteen-gauge steel, and the guide grooves are subject to rapid wear. To avoid these problems, the modified apparatus uses an improved and much faster method of positioning the cross wire.

Instead of pushing the cross wire 329, which is to be welded to the runner wires of each truss of the stack of trusses, through a number of wire guides, the wire is pulled from a wire supply drum (not shown) over a wire guide wheel 330 (FIG. 7) and through and between an assembly of wire straightening and resistance rollers 331, 332 that tightly grasp the wire and resist motion of the wire through the rollers as the wire is pulled by the wire puller to be described below. The rollers 331, 332 continue to hold the upper end of the cross wire after it is inserted into a clamp assembly 333 that is slidably mounted for motion toward and away from the stack of trusses and filler elements upon the lower cross beam 272 of the fixed frame.

The cross wire 329 is not pushed into position nor pushed through a series of guides. Instead it is fed and entirely positioned by being pulled over the feed wheel 330 and through the tight grasp of the straightening resistance rollers 331, 332, by means of a vertically reciprocating wire puller assembly 334.

The wire puller assembly is mounted upon an ORIGA cylinder which is an air-operated cylinder having a side mounted piston available from Origa Company of 928 Oaklawn Avenue, Elmhurst, Illinois 60126. The ORIGA cylinder comprises a hollow tube 335 in which is mounted a piston or shuttle 335a that is driven to one end of the other end of the cylinder by means of air under pressure applied through hoses (not shown) to opposite ends of the tube 335. The piston includes a portion projecting through a longitudinally extending slot in the tube, sealed against loss of pressurized air, and connected to a slide 336 to which may be mounted apparatus to be driven by the piston.

Figure 8:
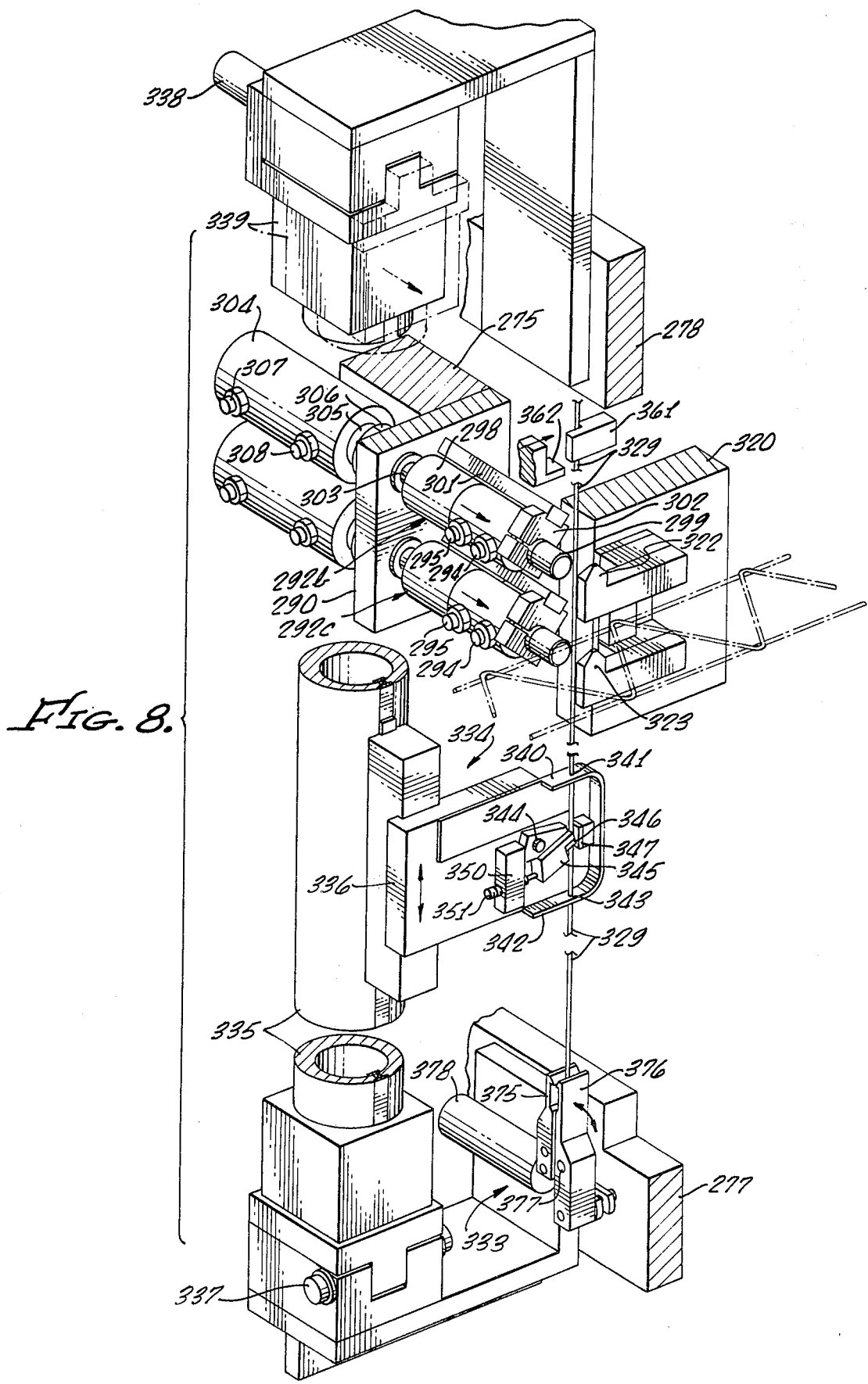
FIG. 8 is a fragmented perspective view of operating parts of the apparatus of FIG. 7.
Figure 9:
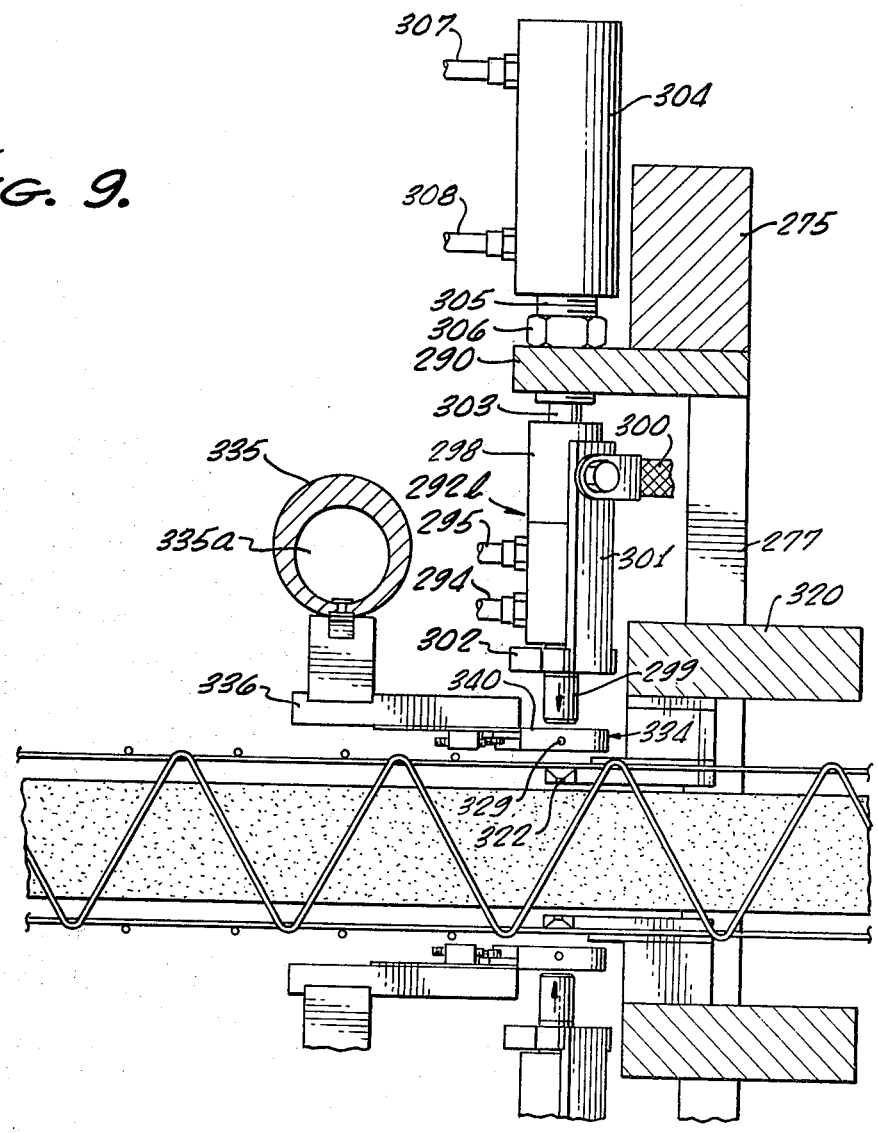
FIG. 9 is a fragmentary plan view showing the relation between electrode, backup finger, truss and wire puller of the apparatus of FIG. 7.

The tube is mounted at its lower end to the lower horizontal cross bar 277 of the reciprocating frame upon a pivot 337 that allows the upper end of the tube to move toward and away from the center of the welding apparatus, such motion being in substantially in the plane of the drawing of FIG. 7. A double-acting air cylinder 338 is fixed to the upper structural bar 278 of the movable frame and is connected to a fitting 339 fixed to the upper end of the tube 335 so as to drive the tube to and from the center of the apparatus about its pivot 337. Fixed to the wire puller slide 336, as best seen in FIG. 8, is a substantially U-shaped slide guide frame having upper and lower substantially horizontally-extending arms 340, 342 in which are formed mutually aligned wire guide apertures 341, 343 for reception and guiding of the cross wire 329 therethrough.

Mounted to the slide between the upper and lower guide frame arms for motion about an eccentric pivot 344 is a gripper 345 having a gripper finger 346 that cooperates with a pressure bar 347 fixed to the slide and arranged to form a backup for the cross wire when it is pressed toward the pressure bar by relative upward motion of the outer end of the eccentrically pivoted gripper finger 346. The length of the gripper between the end of finger 346 and pivot 344 is greater than the shortest distance between the pivot and the pressure bar, to thereby provide eccentric gripping action. A finger stop block 350 is fixed to the slide and carries through the block 350 to an adjustable position wherein it limits pivotal motion of the gripper 345 in a clockwise direction, as viewed in FIG. 8. The plunger urges the gripper in a counterclockwise direction to bear against the cross wire interposed between the gripper finger 346 and pressure bar 347.

The welding apparatus of FIGS. 7-12, like the first-described embodiment, is completely symmetrical about a central plane extending longitudinally of the machine (normal to the plane of the paper as viewed in FIG. 7). All of the equipment and apparatus, including the bank of welding heads and their cylinder drives, the backup fingers, the cross wire wheel, wire straighteners, and the wire pullers and clamps, are all duplicated on the other side of the machine. Thus, the apparatus can weld two cross wire simultaneously, one on each side of a stack of trusses and filler elements that is guided, as previously described, for motion between the vertically extending rows of electrodes in an upper track 353 that bears upon the upper surface of an upper pressure member 354. A movable stack carrier 355 supports the lower end of the stack as the carrier, stack and pressure member 354 all travel in steps between the electrode rows along a fixed lower horizontal track 356. As previously described, the stack is maintained in compression as it is incrementally advanced through the cross wire welding apparatus between the two banks of vertically extending electrodes.

A wire cutter assembly 360 (FIGS. 7, 10, 12) is fixedly carried by the fixed horizontal frame bar 273 at the upper end of the electrode banks. The cutter assembly includes a fixed anvil 361 and a slidably mounted cutter 362 that is driven to and from cutting position by a double-acting air cylinder 363. A forwardly-extending cutter assembly support bar 364, mounted at its rearward end to the fixed frame fixedly carries anvil 361 and, at its forward end, carries the cutter drive cylinder 363. The cylinder piston is connected to a slide 365 on the rearward end of which is fixed the cutter 362. As previously indicated, the cutter assembly, as all other components, is duplicated on the other side of the apparatus. The cutter assembly is below the bottom of the wire puller when the latter is in its uppermost position (shown in dotted lines in FIG. 10), and thus either the puller or cutter must be displaced from the reciprocating path of the wire puller to allow the puller to clear the cutter as it moves up and down. Such displacement of the wire puller about its pivot 337 is shown in dotted lines in FIG. 12. In the position illustrated in FIG. 7 (and in solid lines in FIG. 12), the wire puller assembly is in a retracted position. This is achieved by retraction of the piston of air cylinder 338 to move the upper end of wire puller tube 335 outwardly or to the left as shown in FIG. 7, about pivot 337. In this outward retracted position, the wire puller assembly is moved upwardly and downwardly and will clear the wire cutter 360. For welding and cutting, cylinder 338 is operated to drive the upper end of the puller tube 335 inwardly to move the cross wire closer to the runner trusses and into alignment with the cutter anvil and cutter bar.

Figure 11:
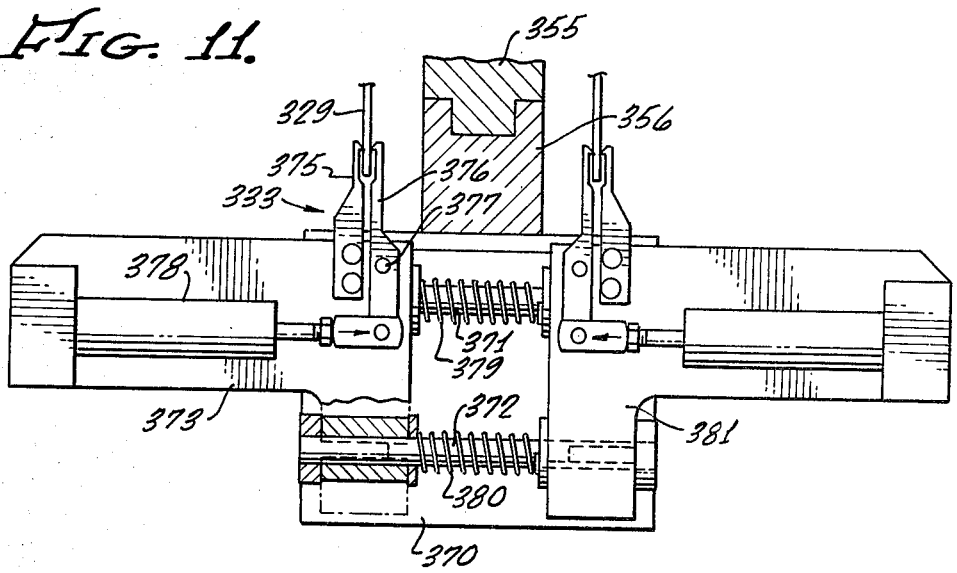
FIG. 11 is a section taken in lines 11—11 of FIG. 10.
Figure 12:
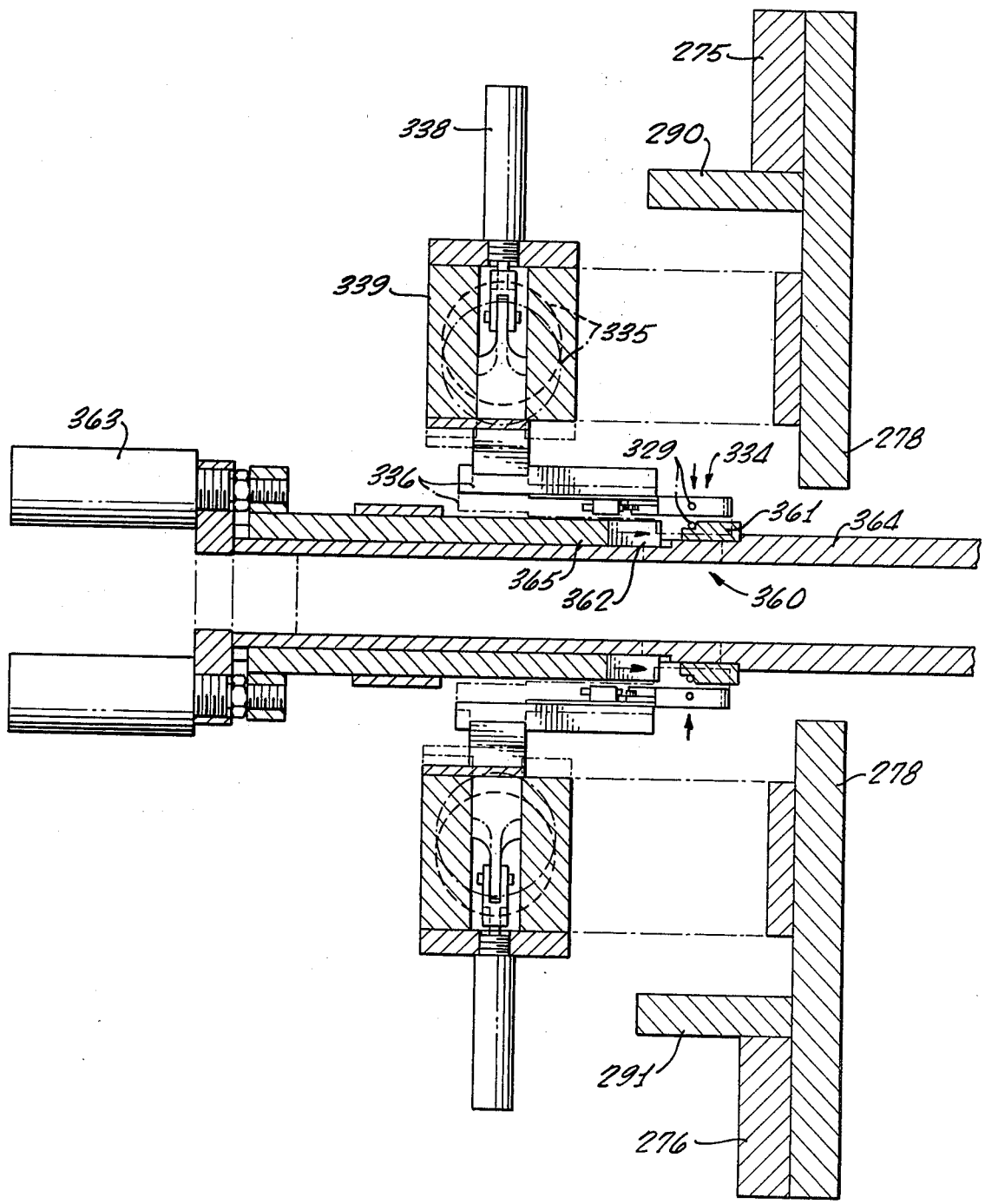
FIG. 12 shows a relation between the wire cutters and wire pullers of the modified apparatus.

As best seen in FIGS. 10 and 11, clamp assembly 333 comprises a clamp support 370 fixed to the fixed frame and carrying upper and lower rods 371, 372 secured thereto. Slidably mounted on an end of the rods 371, 372 is an L-shaped clamp block 373 carrying a fixed clamp finger 375 and a movable clamp finger 376 that is pivoted to the block on a pivot pin 377 and driven by a double-acting air cylinder 378 mounted on the block 373. The clamp assembly is also duplicated on the other side of the apparatus and springs 379, 380 circumscribe rods 371, 372, respectively, being compressed between block 373 on one end and the similar sliding block 381 on the other. Thus, the two clamp assemblies are spring-urged outwardly, but are slidable inwardly toward each other.

OPERATION

The stack of horizontally-extending filler elements and trusses, mounted upon and pressed between the panel carrier 355 and the upper pressure arm 354 is moved along and between the panel tracks in incremental steps just as previously described, each step being equal to the distance between the cross wires that are yet to be welded to the truss runner wires. Just as previously described, the truss runner wires on either side of the stack are positioned laterally just outwardly of the backup fingers. During motion of the stack, the reciprocating frame is in a lower position to allow the truss struts to clear the backup fingers. The stack is stopped and in position for welding of a first pair of cross wires on either side. A cross wire on each side is initially pulled over the wire feed wheel 330, through the straightening rollers 331, 332 and inserted through the wire guide apertures 341, 343 of the slide guide frame (which is in its uppermost position) to project below guide arm 342. The wire puller 336 is driven downwardly, pulling the cross wire transversely of and adjacent the vertical rows or stack of truss runners from the top end of the row of trusses to its bottom end. The cross wire is pulled down from the upper end of the stack to the lower end between the bank of electrodes and their backup fingers until the protruding lower end of the cross wire is inserted into the lower wire clamp 333. Initially clamp cylinder 378 is in retracted position to open the clamp fingers 375, 376. Upon insertion of the cross wire between the clamp fingers, cylinder 378 is operated to cause the fingers to tightly grasp the end of the cross wire. Now the wire puller is operated to move the slide 336 back toward the upper end of the welding apparatus. Wire puller tube 335 is in a vertical position and motor 338 remains retracted to hold the upper end of the tube in its outer position. In this condition, the slide guide frame 342 travels between the free ends of the several electrodes and the row of truss runner wires of the stack (see FIG. 9). In retracted position of the wire puller assembly, the slide guide frame with the cross wire 329 protuding therethrough will clear the wire cutter assembly (see FIG. 12).

As the slide and slide guide frame are driven downwardly from the uppermost position, the frictional engagement between the cross wire and the free end of the gripper finger 346 tends to pivot the gripper in a counterclockwise direction, as viewed in FIG. 8, which tends to drive the eccentrically pivoted gripper closer to the fixed pressure bar 357 and thus the gripper more tightly grasps the cross wire that is interposed between the gripper finger and the pressure bar. Therefore, upon downward motion of the slide, the cross wire is tightly and immovably grasped by the wire puller and is tensioned and pulled downwardly, sliding through the tightly holding straightening and resistance rollers 331, 332 to enable positioning and clamping of the free end of the cross wire in the clamp assembly 333. Upon clamping of the cross wire end, the slide is driven back to its upper position.

As the slide and slide guide frame of the wire puller are driven upwardly, the free end of the cross wire remains tightly gripped in the clamp 333 and the pivoted gripper is urged couterclockwise by the spring-pressed plunger 351. The pressure of the finger 346 upon the wire, during upward motion, is considerably less than its pressure during downward motion and, therefore, the gripper is free to slide along the cross wire. As the slide and slide guide move upwardly along the wire that is now fixedly secured in its lower end, the wire is in sliding frictional engagement with the wire guide apertures 341 and 343 and is frictionally, but slidably engaged between the pressure bar 347 and gripper finger 346. This relation helps to maintain the cross wire position and to further straighten the wire, removing slack from the cross wire. The gripper assembly is a one-way device, in effect grasping the wire tightly and immovably in one direction of puller motion and grasping the wire frictionally but slidably in the other direction. The cross wire is stiff and held at both ends. Therefore, even if it still has a "memory" that might tend to curl or bend it, the wire remains accurately positioned adjacent the row of runner wires as long as it is held at its ends. In other words, even though the cross wire has not been completely straightened and still has some curvature (in unstressed natural condition), the described arrangement will hold it in proper position without a series of guides or the like.

As the slide and slide guide move upwardly, tube 335 is in its laterally retracted (outer) position, and thus the slide guide will clear the wire cutter, coming to rest at its uppermost position (FIG. 10, dotted line showing) wherein the cutter is below the lower arm 342 of the slide guide.

During upward motion of the wire puller slide and slide guide, the reciprocating frame cylinder 286 is energized to raise the movable frame, thus raising the backup fingers through the horizontal planes of the trusses to position the respective backup fingers directly behind (inwardly of) the truss runners. The electrodes, which are also mounted on the reciprocating frame, move upwardly with the backup fingers. Therefore, the alignment of the electrode paths with the backup fingers remains fixed. This is an advantage over the embodiment earlier described since, in the latter arrangement, it is possible on occasion that the backup fingers, which are movable independently of the electrodes, would engage or hang up on portions of the trusses, such as the sinusoidal strut apex, and thus an advancing electrode could be pressed against the cross wire without the desired backup.

As the wire puller slide and slide guide attain their uppermost position, the electrode drive cylinders 304 and the wire puller assembly drive cylinder 338 are energized to drive the electrodes inwardly toward the backup fingers and to pivot the upper end of the wire puller tube 335 a small amount about its pivot 337. As the wire puller assembly pivots inwardly and the electrodes advance toward the backup fingers and the interposed cross wires and truss runner wires, the cross wire is moved inwardly at its upper portion because it is still held in the inwardly moving wire puller. As the electrodes contact the cross wire, which is now considerably closer to the runner wires (at least at its upper end), the cross wire is pressed toward and against the runner wires. This pressure causes the clamps 333, that hold the lower ends of the cross wire, to slide inwardly, thus compressing springs 379, 380 and bringing the cross wires in toward the runner wires at the bottom without any substantial bending of the wire at this point. It may be noted that the motion of the cross wire toward the runner wire, the motion of the puller assembly and clamps, and also the total advance of the electrodes are quite small. The cross wire is initially positioned within less than one-half inch of the runner wires and the length of the advancing path of the electrodes is less than one inch.

As the electrodes contact the cross wire and press these against the runner wires, the latter are further pressed against the backup fingers, all with equal force, just as described in the first embodiment. The pressure of the electrodes upon the workpiece remains the same, as previously described, regardless of wear on the electrode tips and other factors that may tend to affect the length of the path of travel of the electrodes.

When the electrodes are fully extended, current is passed through the electrodes through wire leads 300, conductive bar 301, clamp 302, through the electrode head 299, through the cross wire at the junction of the cross wire and runner wire. From this junction, current flows through the backup fingers and through the cross wire to the next adjacent intersection of the same cross wire with the runner of the adjacent truss and then back through the adjacent electrode and through its connecting electrical lead.

As the wire puller tube 335 is moved inwardly to move the upper end of the cross wire closer to the runner wires, the cross wire is moved into cutting position with respect to the wire cutter, being positioned now (as shown in dotted lines in FIG. 12) directly between the cutter anvil 361 and the moving cutting bar 362. Thus, upon completion of the welds, the electrodes begin to retract, starting their outward motion and the cutter cylinder 363 is energized to cut the wire at a point spaced below the lower arm 342 of the wire cutter slide guide frame. This leaves a free end of the severed cross wire extending downwardly from the guide aperture 343 in the lower slide guide arm 342. It is this free end that forms the lower end of the next cross wire which will be inserted into the clamp 333 on the next downward stroke of the wire puller. Thus, the cross wire remains firmly confined and guided in and within the wire puller assembly, ready for the next downward stroke.

As the electrode drive cylinders 304 are energized to retract the electrodes, the wire puller cylinder 338 is energized to retract the upper end of the puller tube 335 and the vertical frame reciprocating cylinder 286 is energized to lower this frame, thus lowering all electrodes and all backup fingers by a distance sufficient to enable the backup fingers to clear the trusses. Now the entire stack is advanced between the rows of electrodes through an incremental distance equal to the desired distance between adjacent cross wires, the lowered position of the backup fingers permitting the trusses to be advanced without interference between the truss strut members and the fingers.

The cycle is then repeated. As the wire puller assembly is driven downwardly, the frictional engagement of the gripper finger 346 with the cross wire 329 pivots the gripper into tighter gripping engagement with the wire and thus the wire is pulled downwardly, as previously described. The free end of the cross wire depending from the lower arm 342 of the slide guide frame is inserted into the clamp 333, the clamp is locked upon the wire end, and the puller returns to the upper end of the apparatus, as previously described. One complete downward and upward stroke of the wire puller requires much less time than the time needed to feed the wire downwardly through the wire guides of FIGS. 1-6, thus the preferred embodiment is much faster. It will be understood, of course, that the described operations take place on both sides of the stack simultaneously, since, as previously mentioned, all of the parts, the rows of electrode assemblies, the wire puller assemblies, the clamps, wire cutters, wire straighteners, wire guides and wire feeds, are all duplicated, being identical on both sides of the apparatus.

The foregoing detailed description is to be clearly understood as given by way of illustration and example only, the spirit and scope of this invention being limited solely by the appended claims.

I claim:

1. Apparatus for fabricating a three-dimensional panel composed of a stack of wire trusses alternated with elongated filler elements to provide a composite structural panel composed of a three-dimensional wire lattice and a filler therefor, each said truss including mutually spaced, longitudinally extending runner wires interconnected by struts, said apparatus comprising a support, means for holding said trusses and filler elements on said support, a plurality of extensible fluid motors mounted on said support, a plurality of electrodes mounted on respective ones of said motors for motion toward said trusses along paths aligned with respective runner wires of said trusses, means including a pneumatically driven wire pulling shuttle for positioning a cross wire transversely of said runner wires and transversely of said paths, means for energizing said motors to advance said electrodes along said paths and press said cross wire and runner wires together with mutually predetermined pressures, and means for flowing electric current between said electrodes and said wires.

2. The apparatus of claim 1 wherein said motors and electrodes are mounted on said support on one side of said stack of trusses and filler elements, and including a second plurality of electrodes mounted on said support on the other side of said stack of trusses and filler elements for motion toward said trusses and toward said first-mentioned electrodes along paths aligned with respective runner wires of said trusses, means for positioning a second cross wire transversely of said runner wires and transversely of the paths of said second plurality of electrodes, means for advancing said second plurality of electrodes along said second paths to press said second cross wire and runner wires together, and means for flowing electric current between said second-mentioned electrodes and said wires.

3. The apparatus of claim 1 including a plurality of backup members, and means for selectively moving said backup members between a first position in which said backup members are clear of said trusses and a second position in which said backup members are adapted to press against the trusses to oppose force exerted by said electrodes.

4. The method of resistance welding a workpiece at a plurality of points comprising mounting a plurality of fluid motors in predetermined relative positions, mounting a plurality of weld electrodes to respective ones of said motors to be shifted thereby, positioning a backup member behind said workpiece at each of said points, positioning a plurality of mutually spaced first wires in a row between respective pairs of electrodes and backup members, feeding a cross wire to one end of said row of first wires, said wires forming said workpiece, pneumatically pulling said cross wire transversely of and adjacent to said row of first wires from said one end to the other of said row, holding said cross wire at said ends so as to place the cross wire under substantial tension, moving said electrodes and backup members in unison from a first position in which the backup members clear said workpiece to allow the workpiece to be moved relative to said backup members and electrodes, to a second position in which the backup members flank the workpiece to enable the electrodes to press the workpiece against the backup members, applying fluid pressure to fluid motors to shift said electrodes into contact with said workpiece to press against said workpiece and press the workpiece against said backup members with a force directly related to pressure applied to said motors, and flowing electric current between said electrodes and workpiece.

5. The method of claim 4 including the step of shifting said cross wire toward said row of first wires as said electrodes are shifted into contact with the workpiece.

6. Apparatus for fabricating a three-dimensional lattice structure composed of a plurality of mutually spaced lattices interconnected by cross wires, each said lattice having a longitudinally extending runner wire extending transversely of said cross wires and welded thereto, said apparatus comprising a support, means for holding said lattices on said support in an assembly of mutually spaced lattices, a plurality of electrodes mounted on said support for motion toward said lattices along paths aligned with respective runner wires of said lattices, wire drive means for positioning a cross wire transversely of said runner wires and transversely of said electrode paths, said wire drive means comprising wire feed means on said support at one side of an assembly of lattices on the support for supplying a cross wire to such assembly, wire holding means on said support at the other side of such assembly for holding a cross wire, and wire puller means mounted on said support for pulling a cross wire from said feed means to said holding means, means for advancing said electrodes along said paths toward said cross wire and runner wires, and means for flowing electric current between said electrodes and said wires.

7. The apparatus of claim 6 wherein said puller means comprises a releasable wire gripper mounted for reciprocation along a wire feed path extending adjacent to and transversely of said electrodes.

8. The apparatus of claim 7 including means for shifting said wire puller means transversely of said wire feed path to shift a cross wire toward an assembly of lattices on the support.

9. The apparatus of claim 7 including a wire cutter displaced from said wire feed path and means for relatively shifting said puller means and cutter to align a cross wire with said cutter.

10. The apparatus of claim 6 wherein first and second mutually adjacent ones of said electrodes are connected in a common circuit to flow current from said first electrode at one runner of one lattice through the cross wire between said one runner and a corresponding runner of an adjacent lattice to said second electrode.

11. The apparatus of claim 6 including means for mounting said wire holding means for motion toward an assembly of lattices on said support.

12. Apparatus for fabricating a three-dimensional structure composed of a stack of wire trusses alternated with elongated filler elements to provide a composite structural panel composed of a three-dimensional wire lattice and filler therefor, each said truss including mutually spaced, longitudinally extending runner wires interconnected by struts, said apparatus comprising a support, means for holding a stack of said trusses and filler elements on said support, a plurality of electrodes mounted on the support for motion toward said trusses along paths aligned with respective runner wires of said trusses, wire drive means for positioning a cross wire transversely of said runner wires and transversely of said paths, said drive means comprising a wire puller, means for reciprocating said puller along a path extending transversely of said runner wires and transversely of said paths, a wire clamp at one side of said support, and means at the other side of said support for supplying wire to said puller, means for advancing said electrodes along said paths to press said cross wire and runner wires together, and means for flowing electric current between said electrodes and said wires.

13. The apparatus of claim 12 including a carrier frame reciprocally mounted on said support for transverse motion, said electrodes being mounted to said carrier frame, a plurality of backup members mounted on said frame in position to oppose force exerted by said electrodes, and means for reciprocating said frame.

14. The apparatus of claim 12 wherein said wire puller comprises a slide, a wire guide on said slide, a wire gripper on said slide, a shuttle mounted to said support for reciprocation along said plurality of electrodes, and means for driving said shuttle back and forth, said slide being mounted on said shuttle.

15. The apparatus of claim 12 including a wire cutter at said one side of said assembly, and means for laterally shifting said wire puller into alignment with said wire cutter.

16. The apparatus of claim 12 including a cutter displaced from said puller path, and means for shifting said puller to align a wire therein with said cutter.

17. The apparatus of claim 16 including means for mounting said wire clamp for motion in the direction of motion of said electrodes, whereby a cross wire and said wire clamp both may be shifted by said electrodes.

18. The method of welding a three-dimensional structural lattice comprised of a group of mutually spaced wire trusses, said trusses comprising longitudinally extending mutually spaced runner wires interconnected by struts, said method comprising the steps of feeding a cross wire toward the trusses to be welded, grasping one end of said cross wire in a wire puller and driving the puller transversely of and adjacent to said runner wires along one side of said group, clamping said cross wire end at one side of said group of said trusses, returning the puller to the other side of said group of trusses by sliding the puller along the clamped cross wire while the puller is frictionally engaged with the cross wire, driving a plurality of electrodes against said cross wire to press the cross wire against a plurality of said runner wires, and passing electric current between said electrodes and said wires.

19. The method of claim 18 including pulling a second cross wire transversely of and spaced from runner wires along the other side of said group, driving a second group of electrodes against said second cross wire as said first group of electrodes presses against said first mentioned cross wire, and passing electric current between electrodes of said second group and said second cross wire.

20. The method of claim 18 including the step of positioning a backup member against each of a number of said runner wires to oppose force exerted upon the cross wires and runner wires by the electrode pressing thereon.

21. The method of claim 20 including the steps of retracting said electrodes, shifting said electrodes and said backup members in a first direction relative to said trusses, shifting said group trusses relative to said electrodes in a second direction transverse to said first direction, positioning a further cross wire transversely of said runner wires at points thereon spaced from said first-mentioned cross wire, shifting said electrodes and backup members relative to said trusses in a direction opposite said first direction, driving said electrodes against said second cross wire, and passing electric current between said electrodes and said second cross wire.

22. The method of claim 18 including the step of moving said wire puller and a cross wire gripped therein toward said group of wire trusses when the puller is moved back to said one end.

23. The method of claim 18 including the step of laterally shifting said puller at said one end of said group of trusses to laterally shift the cross wire into cutting position, and cutting said cross wire.

24. The method of claim 23 wherein said cutting is carried out between said puller and said group of trusses whereby an unsevered portion of said cross wire remains in guided relation to said puller.

25. The method of claim 18 wherein the cross wire is pulled along a path spaced from the group of trusses, and including shifting the cross wire toward the group.

26. Apparatus for fabricating a three-dimensional lattice structure composed of a plurality of mutually spaced trusses interconnected by cross wires, said apparatus comprising a support, means on said support for holding a plurality of trusses in mutually spaced relation to form an assembly extending from a first end truss at one side of said support to a second end truss at an opposite side of said support, wire feed means for supplying wire toward said first end truss, a row of mutually spaced electrodes on said support extending between said support sides, a wire clamp mounted at said opposite side of said support, wire puller means for releasably gripping wire from said feed means, means for mounting said wire puller means for motion along a puller path at one side of said row of electrodes between a first position at said one support side and a second position adjacent said wire clamp, means for reciprocating said wire puller means between said first and second positions, means for driving said electrodes, and means for passing current to said electrodes.

27. The apparatus of claim 26 wherein said means for passing current comprises means in circuit with the electrodes of a pair of adjacent electrodes for flowing current from one electrode of such pair to the other through a wire that is to be welded by said electrode pair at a pair of points thereon.

28. The apparatus of claim 26 including a carrier frame mounted on said support for reciprocation in a direction parallel to the extent of said row of electrodes, a plurality of backup fingers mounted to said frame, each finger being positioned in alignment with a respective one of said electrodes in at least one position of said frame to form a row of backup fingers parallel to and spaced from said row of electrodes, said puller path extending between said electrode row and said backup finger row.

29. The apparatus of claim 28 wherein said electrodes are mounted on said carrier frame for movement in unison with said backup fingers to maintain alignment of each electrode and its backup finger.

30. The apparatus of claim 26 including wire cutter means mounted on said support and offset from said puller path, and means for relatively shifting said wire cutter means and said wire puller means whereby a wire in said puller means may be aligned for cutting in said cutter means.

31. The apparatus of claim 26 wherein said wire puller means comprises a slide, a wire gripper on said slide, a wire guide on a side of said slide proximate said wire clamp, whereby a wire secured in said gripper and extending from said guide may be inserted into said clamp as said wire puller attains said second position.

32. The apparatus of claim 31 wherein said wire guide comprises a wire receiving aperture formed in said slide, and wherein said wire gripper comprises a pressure bar fixed to said slide and a wire gripping finger pivoted to said slide, said finger having a length greater than the distance between its pivot and the pressure bar, whereby a wire between the gripping finger and pressure bar is gripped more tightly in one direction of relative motion of wire and wire gripper.

33. The apparatus of claim 31 including a wire cutter mounted on said support between said first position of said puller means and said one side of said support, said wire cutter being displaced laterally of said puller path, and means for effecting relative motion of said wire puller means at said first position and said wire cutter in a direction laterally of said path of motion of said wire puller.

34. The apparatus of claim 33 wherein said wire clamp is slidably mounted on said support for motion transversely of said puller path.

35. The apparatus of claim 33 wherein said means for mounting said wire puller means comprises an elongated guide tube, said slide having a shuttle slidably mounted in said guide tube, said means for reciprocating said wire puller means comprising means for driving said shuttle back and forth within said guide tube, said means for effecting relative motion of said wire puller means and said wire cutter comprising a pivotal connection between one end of said guide tube and said support and a motor for shifting the other end of said guide tube about said pivotal connection.

36. Apparatus for fabricating a three-dimensional lattice structure composed of a plurality of mutually spaced parallel trusses interconnected by cross wires, each said truss having struts extending in the plane of the truss and having longitudinally extending runner wires connected to said struts, the runner wires extending transversely of said cross wires and adapted to be welded thereto, said apparatus comprising a support,
means for holding said trusses on said support in mutually spaced relation in parallel planes,
a carrier frame mounted on said support for reciprocation in a direction transverse to the planes of said trusses and having first and second sides on opposite sides of trusses held on said support,
means for reciprocally driving said carrier frame,
first and second weld head beams carried by said frame adjacent said first and second sides, respectively,
first and second rows of welding electrodes mounted on said beams, respectively, for movement to and from runner wires of trusses held on said support and along paths intersecting said runner wires, first and second finger carriers mounted on said frame adjacent said first and second sides, respectively,
first and second rows of weld back-up fingers mounted on said finger carriers, each said finger being aligned with an individual one of said electrodes and movable with said electrodes and carrier frame between a first position in which each pair of an electrode and its aligned back-up finger is aligned with and on opposite sides of a runner wire of a given truss and a second position in which each such pair is displaced from the plane of such truss, first and second wire pullers mounted on opposite sides of said support for reciprocation between rows of electrodes and back-up fingers, said pullers including gripping means for pulling cross wires across said paths between said electrodes and back-up fingers.

37. The apparatus of claim 36 including pneumatic means for driving said pullers from a start position at one end of said rows of electrodes to a clamp position at the other end of said rows of electrodes, clamp means at said other end of said rows of electrodes for holding an end of a cross wire, means for driving said pullers along and in engagement with cross wires held in said clamp means back to said start position, and means for moving said welding electrodes toward said runner wires for welding of said cross wires thereto after said pullers return to said start position.

38. The apparatus of claim 37 including means for transversely shifting said pullers upon return to said start position to shift cross wires gripped therein to a welding position.

39. The apparatus of claim 36 including first and second pneumatic cylinders mounted to said frame at opposite sides thereof, each cylinder having a side mounted piston, said pullers being mounted on respective ones of said pistons for pneumatically actuated reciprocation.

* * * * *